United States Patent
Christian et al.

(10) Patent No.: US 9,421,917 B1
(45) Date of Patent: Aug. 23, 2016

(54) EQUIPMENT HOLDER FOR WORKERS AND SAFETY, RESCUE AND DISASTER CREWS

(71) Applicant: RUBBER BOOT BUDDY, LLC, Angleton, TX (US)

(72) Inventors: Conner Wayne Christian, Angleton, TX (US); Corey Howard Christian, Angleton, TX (US)

(73) Assignee: RUBBER BOOT BUDDY, LLC, Angleton, TX (US)

(*) Notice: Subject to any disclaimer, the term of this patent is extended or adjusted under 35 U.S.C. 154(b) by 104 days.

(21) Appl. No.: 14/183,270

(22) Filed: Feb. 18, 2014

Related U.S. Application Data

(60) Provisional application No. 61/815,545, filed on Apr. 24, 2013.

(51) Int. Cl.
*A47J 47/16* (2006.01)
*B60R 9/00* (2006.01)

(52) U.S. Cl.
CPC .................................. B60R 9/00 (2013.01)

(58) Field of Classification Search
CPC ............... E04F 2011/1872; E04F 11/1804; F21W 2111/08; A47K 3/003; A47K 10/10
See application file for complete search history.

(56) References Cited

U.S. PATENT DOCUMENTS

| | | | | |
|---|---|---|---|---|
| 1,019,662 A * | 3/1912 | Kroder | A47H 1/022 | 211/105.2 |
| 1,072,204 A * | 9/1913 | Boehm | A47K 10/04 | 211/123 |
| 1,219,476 A * | 3/1917 | Nelson | A47K 10/04 | 211/123 |
| 1,325,472 A * | 12/1919 | Ide | A47K 10/04 | 211/123 |
| 1,395,707 A * | 11/1921 | Grierson | A47K 1/08 | 248/220.21 |
| 1,487,017 A * | 3/1924 | Lilja | A47H 1/022 | 211/105.2 |
| D66,318 S * | 12/1924 | Baker | D6/533 | |
| 1,557,989 A * | 10/1925 | Dombrowsky | A47G 25/746 | 211/85.3 |
| 1,576,077 A * | 3/1926 | Watson | A47K 10/10 | 211/123 |
| 1,594,714 A * | 8/1926 | Eustis | A47K 10/10 | 211/123 |
| 1,680,668 A * | 8/1928 | De Boer | B60N 3/12 | 131/241 |
| 1,769,326 A * | 7/1930 | Weis | A47K 10/04 | 211/123 |
| 1,972,282 A * | 9/1934 | Wittstein | A47K 10/10 | 211/123 |
| 2,195,979 A * | 4/1940 | Ziolkowski | A47H 1/022 | 160/335 |
| 2,280,381 A * | 4/1942 | Davis | A43D 117/00 | 211/35 |
| 2,402,127 A * | 6/1946 | Cohn | A47K 10/10 | 211/123 |
| 2,443,343 A * | 6/1948 | Crocker | A47K 10/10 | 248/251 |
| 2,447,908 A * | 8/1948 | Hoots | B60R 7/10 | 211/123 |
| 2,520,051 A * | 8/1950 | Newland | B60R 7/10 | 211/123 |
| 2,522,174 A * | 9/1950 | Hermsmeyer | B60R 7/10 | 211/123 |

(Continued)

*Primary Examiner* — Brodie Follman
(74) *Attorney, Agent, or Firm* — Buskop Law Group, PC; Wendy Buskop

(57) ABSTRACT

An equipment holder for workers, fire fighters and rescue teams consisting of: a flat bar having a front side and a back side, an impact resistant rod body with a first leg and a second leg formed at angles to the body and attached to the flat bar, wherein the legs are spaced apart from each other the length of the rod body; a holster for securing additional equipment attached to the flat bar and the body, wherein hip waders and boots can be secured in an inverted position between the flat bar and the body and the flat bar can be fastened to an exposed portion of a vehicle for transport.

15 Claims, 4 Drawing Sheets

(56) References Cited

U.S. PATENT DOCUMENTS

| | | | | |
|---|---|---|---|---|
| 2,523,857 A * | 9/1950 | Baumgardt | B60R 7/10 | 211/123 |
| 2,526,285 A * | 10/1950 | Schuyler | B60R 7/10 | 211/123 |
| 2,532,909 A * | 12/1950 | Hart | B60R 7/10 | 211/123 |
| 2,540,023 A * | 1/1951 | Ackerman | B60R 7/10 | 211/123 |
| 2,573,376 A * | 10/1951 | Wirth | A47F 5/0876 | 211/123 |
| 2,617,571 A * | 11/1952 | Hart | B60R 7/10 | 211/123 |
| 2,647,641 A * | 8/1953 | Tritt | A47K 10/10 | 211/123 |
| D173,824 S * | 1/1955 | Toner | D6/548 | |
| 2,929,513 A * | 3/1960 | Herzberg | A47K 10/10 | 211/106.01 |
| 2,940,719 A * | 6/1960 | Taubman | A47K 10/10 | 248/251 |
| 2,988,315 A * | 6/1961 | Saxe | F16B 5/126 | 211/106.01 |
| 3,156,977 A * | 11/1964 | Logan | B21C 37/15 | 211/105.2 |
| 3,260,021 A * | 7/1966 | Katz | A47K 10/10 | 211/105.1 |
| D206,050 S * | 10/1966 | Anders | A47K 10/10 | D6/549 |
| 3,384,333 A * | 5/1968 | Bohlman | E04F 11/1804 | 248/251 |
| 3,489,382 A * | 1/1970 | Larson | A47F 5/0823 | 211/105.2 |
| 3,523,322 A * | 8/1970 | Rossow | A47B 95/02 | 16/412 |
| 3,606,018 A * | 9/1971 | Ruina | D06F 57/12 | 211/1.3 |
| 4,193,586 A * | 3/1980 | Guenther | E04F 11/1804 | 256/69 |
| 4,376,486 A * | 3/1983 | Arcadi, Jr. | A47F 7/08 | 211/35 |
| 4,415,141 A * | 11/1983 | Guenther | E04F 11/1804 | 256/69 |
| 4,429,638 A * | 2/1984 | Licari | A47B 96/027 | 108/25 |
| D275,631 S * | 9/1984 | Licari | A47B 96/027 | D6/545 |
| 4,586,616 A * | 5/1986 | Cooper | A47J 47/16 | 211/88.04 |
| D291,753 S * | 9/1987 | Pool | A47B 96/027 | D6/522 |
| D301,305 S * | 5/1989 | Bell | A47B 96/027 | 211/105.2 |
| D310,762 S * | 9/1990 | Embree | A47B 96/027 | D6/569 |
| D312,935 S * | 12/1990 | Chap | A47B 96/027 | D6/549 |
| 4,976,455 A * | 12/1990 | Brammer, Sr. | B60P 3/36 | 16/319 |
| D314,130 S * | 1/1991 | Lee | A47B 96/027 | D8/317 |
| D314,486 S * | 2/1991 | Day | A47B 96/027 | D6/555 |
| 5,025,352 A * | 6/1991 | Brown | B60Q 1/323 | 362/211 |
| 5,050,252 A * | 9/1991 | Cuttriss | A47K 17/022 | 211/105.2 |
| D320,720 S * | 10/1991 | Goodman | A47K 17/022 | D6/546 |
| 5,190,267 A * | 3/1993 | Schmitt | A47K 3/003 | 16/430 |
| 5,226,569 A * | 7/1993 | Watjer | B60R 7/10 | 211/123 |
| D340,377 S * | 10/1993 | Brazis | A47K 17/022 | D6/549 |
| D343,976 S * | 2/1994 | Chow | A47K 17/022 | D6/571 |
| D360,095 S * | 7/1995 | Wang | A47K 17/022 | D6/548 |
| 5,515,248 A * | 5/1996 | Canfield | E05B 17/103 | 362/100 |
| 5,554,693 A * | 9/1996 | Ohtomo | C08L 71/123 | 525/133 |
| 5,690,237 A * | 11/1997 | Marzec | A47K 3/003 | 211/105.1 |
| 5,743,416 A * | 4/1998 | Yemini | B25H 3/04 | 211/70.6 |
| 5,750,240 A * | 5/1998 | Findley | A47B 96/201 | 428/174 |
| 5,762,210 A * | 6/1998 | Dahill | A47F 7/0021 | 211/60.1 |
| 5,779,228 A * | 7/1998 | Hansen | B60Q 3/0233 | 256/59 |
| 5,820,205 A * | 10/1998 | Ammons | B60R 7/10 | 224/313 |
| 5,906,304 A * | 5/1999 | Baldacchino | B63B 35/7946 | 224/401 |
| 6,212,809 B1 * | 4/2001 | Gaule | G09F 3/0295 | 40/660 |
| 6,305,558 B1 * | 10/2001 | Bates | A47K 10/04 | 211/105.1 |
| 6,315,357 B1 * | 11/2001 | Johnston | B60R 7/10 | 224/313 |
| 6,371,423 B1 * | 4/2002 | Miller | A47H 1/142 | 211/123 |
| D458,092 S * | 6/2002 | Rumpf | A47H 1/142 | D6/574 |
| D458,498 S * | 6/2002 | Shiflet | A47H 1/142 | D21/759 |
| 6,415,732 B1 * | 7/2002 | Delorenzo | B63B 45/04 | 114/343 |
| 6,554,338 B1 * | 4/2003 | Spence | B60N 3/02 | 16/110.1 |
| D474,281 S * | 5/2003 | Hansen | A47K 3/003 | D25/41.1 |
| 6,592,240 B2 * | 7/2003 | Camarota | A47K 3/003 | 362/399 |
| D486,020 S * | 2/2004 | Hoernig | A47K 3/003 | D6/549 |
| 6,775,937 B2 * | 8/2004 | Ruana | G09F 3/205 | 40/594 |
| D498,663 S * | 11/2004 | Moore | A47K 3/003 | D8/376 |
| 6,843,468 B2 * | 1/2005 | Marshall | A47K 3/003 | 248/205.1 |
| 6,854,163 B1 * | 2/2005 | Ruana | A62B 3/00 | 116/1 |
| 7,007,366 B1 * | 3/2006 | Eby | B60P 3/36 | 29/434 |
| D524,146 S * | 7/2006 | Jolson | A47K 3/003 | D6/567 |
| 7,124,451 B2 * | 10/2006 | Moore | A47K 3/003 | 211/105.1 |
| 7,195,232 B2 * | 3/2007 | Marshall | A47K 3/003 | 16/438 |
| D543,839 S * | 6/2007 | Cooper | A47K 3/003 | D8/376 |
| 7,226,191 B1 * | 6/2007 | Martinez | B60N 3/026 | 362/400 |
| 7,400,232 B2 * | 7/2008 | Reichling | B60R 25/1001 | 16/110.1 |
| D607,519 S * | 1/2010 | Calvin | B60R 7/10 | D21/662 |
| 7,722,207 B2 * | 5/2010 | Bennette | F21V 21/002 | 359/591 |
| 7,735,423 B1 * | 6/2010 | Gold | F42B 12/36 | 102/458 |
| D630,768 S * | 1/2011 | Witiak | B60R 7/10 | D25/41.1 |
| 7,934,701 B2 * | 5/2011 | Kay | B21C 23/142 | 256/1 |
| 7,987,534 B2 * | 8/2011 | Lin | A47K 3/38 | 4/557 |
| D651,670 S * | 1/2012 | Calvin | B60R 7/10 | D21/662 |

(56) References Cited

U.S. PATENT DOCUMENTS

| | | | |
|---|---|---|---|
| D660,063 S * | 5/2012 | Herrera Rodriguez | B60R 7/10 D6/566 |
| D663,985 S * | 7/2012 | Herrera Rodriguez | F21V 33/006 D6/566 |
| D691,220 S * | 10/2013 | Calvin | F21V 33/006 D21/662 |
| 2002/0089173 A1* | 7/2002 | Reidy | G09F 3/205 283/74 |
| 2005/0198732 A1* | 9/2005 | Knirk | A47K 17/022 4/576.1 |
| 2007/0204437 A1* | 9/2007 | Hartmann | B60N 3/023 16/444 |
| 2008/0251305 A1* | 10/2008 | Shin | B62D 25/12 180/69.21 |
| 2009/0184067 A1* | 7/2009 | McAdory | B60R 7/10 211/35 |
| 2013/0058074 A1* | 3/2013 | Somei | F21V 33/006 362/145 |
| 2015/0014505 A1* | 1/2015 | Edwards | A47K 1/09 248/251 |
| 2015/0290965 A1* | 10/2015 | Schwartz | E05B 1/0015 428/337 |

* cited by examiner

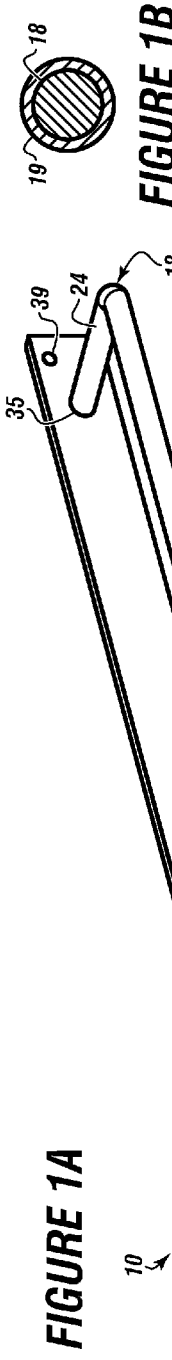
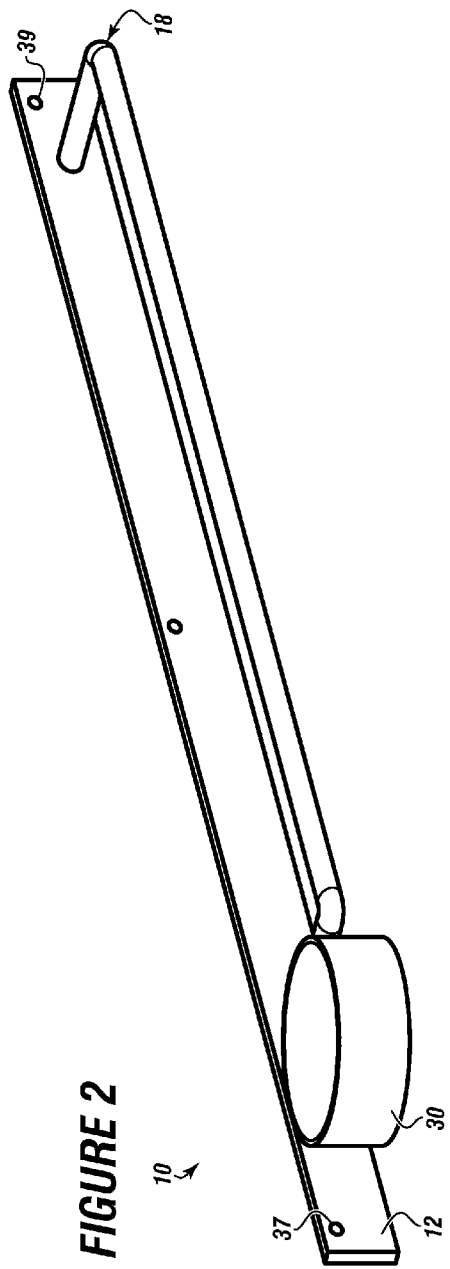

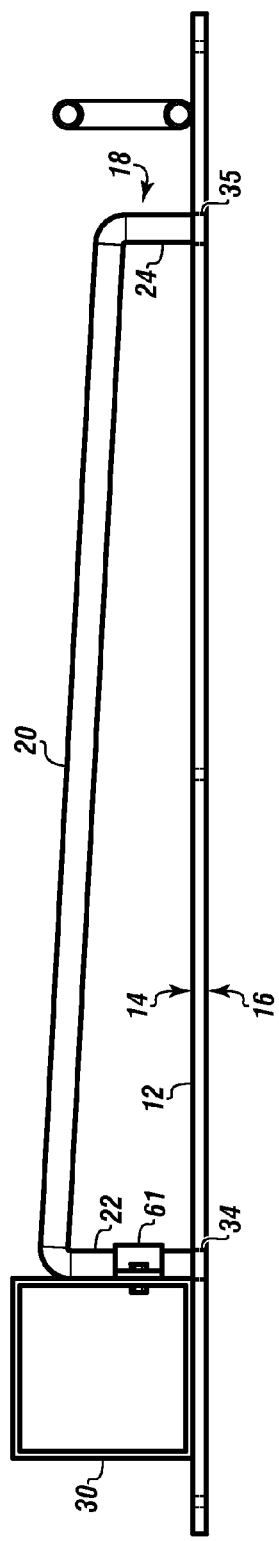

EQUIPMENT HOLDER FOR WORKERS AND SAFETY, RESCUE AND DISASTER CREWS

CROSS REFERENCE TO RELATED APPLICATIONS

The present application claims priority to and the benefit of U.S. Provisional Patent Application Ser. No. 61/815,545 filed on Apr. 24, 2013, entitled "EQUIPMENT HOLDER FOR WORKERS AND SAFETY, RESCUE AND DISASTER CREWS." This reference is hereby incorporated in its entirety.

FIELD

The present embodiments generally relate to an equipment holder for workers and safety and disaster rescue crews which can be secured directly onto vehicles, such as pickup trucks and rescue and disaster vehicles, for securely holding equipment to the vehicles while exposed to rough roads, high velocity winds, rain, and flying debris.

BACKGROUND

A need exists for easily accessible safety equipment and specialized footwear and/or boots for workers that save lives, such as firefighters and hurricane rescue personnel, when they must walk in water with many hazards that cannot be viewed from outside the water.

In addition to footwear and/or boots, rescue and safety workers need quick and safe access to other equipment, such as bolt cutters to open windows and gates, utility tools, and guns for protection.

A further need exists for a device that can withstand hurricane force winds without deforming or coming apart when the rescue worker is in the harsh environment of a natural disaster, such as a hurricane.

The present embodiments meet these needs.

BRIEF DESCRIPTION OF THE DRAWINGS

The detailed description will be better understood in conjunction with the accompanying drawings as follows:

FIG. 1A depicts an equipment holder according to an embodiment.

FIG. 1B depicts a cutaway view of the body of the rod with fluorescent coating disposed on the rod.

FIG. 1C depicts a cutaway view of the body of the rod with impact resistant coating disposed on the rod.

FIG. 2 depicts another embodiment of the equipment holder with a holster.

FIG. 5 depicts a top view of an embodiment of the equipment holder with a wedge shape.

Figure 3A:
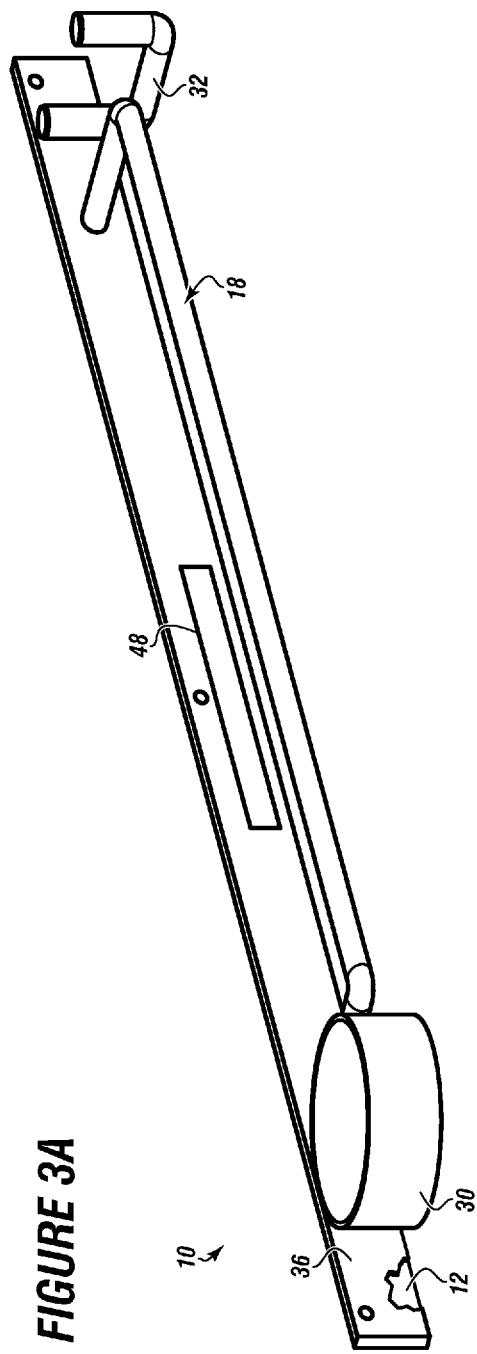
FIG. 3A depicts another embodiment of the equipment holder with a shock resistant coating.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it is practiced or carried out in various ways.

The embodiments relate to an equipment holder for equipment to be used in a disaster or water related incident including: (a) a flat bar adapted to support a rod having a first and second leg that engage the flat bar and support footwear, such as hip waders and a pair of boots for use in high water and in flooded zones, wherein the flat bar is securable to a side of a vehicle open to the elements for ease of access such that the weight of the equipment is entirely supported by the rod against the flat bar while positioning the footwear in an inverted position; and (b) a holster securable to the flat bar adjacent the rod and adapted to secure equipment, such as fire extinguisher nozzles, without dripping toxic material into the vehicle or onto the ground adjacent the vehicle.

In one or more embodiments, the pair of boots can be any kind of boots, such as rubber boots, water repellent boots, safety boots, work boots, or a similar kind of boot.

In one or more embodiments, the equipment holder can be used by fire fighters and can be securely and non-removably attachable to a portion of a fire truck or similar rescue vehicle, wherein the equipment holder is exposed to the elements.

The equipment holder can have a flat bar with a front side and a back side, which can be secured with fasteners directly to the vehicle on an exposed portion of the vehicle. The flat bar can be an easily viewable reflective impact resistant lightweight flat bar.

The equipment holder can include a rod having a body supported by a first leg and a second leg.

In one or more embodiments, the first leg can be formed at a right angle to the body, and a second leg can be formed at a right angle to the body opposite the first leg.

In other embodiments the first leg and the second leg can be attached at any angle to the body, such as greater than 90 degrees and less than 90 degrees.

The rod can be attached to the flat bar. A pair of boots can be supported between the rod and the flat bar in an inverted position without the use of springs, tape, or hooks, for easy accessibility and quick removal while the boots are in an open area of the vehicle. The equipment holder prevents water, mud and debris from entering the boots, and prevents pests, such as scorpions, snakes, frogs and spiders from entering the boots while the boots are not in use and exposed to the elements.

The rod can be secured to the flat bar with a first weld securing the first leg to the front side of the flat bar and a second weld securing the second leg to the front side of the flat bar with the first leg spaced apart from the second leg by the length of the body.

In other embodiments, the equipment holder can be for rescue teams, such as hurricane and tornado disaster rescue teams, securely holding equipment during transport on rough roads, at high speeds, and in conditions of high winds, such as hurricane winds.

In embodiments, the equipment holder can have a flat bar that is self-illuminating for securing to the outside of a vehicle.

In embodiments, the equipment holder can be mounted on the outside of a superstructure of a boat, for fast use and easy accessibility.

A first weld can secure the first leg to the front side of the flat bar. A second weld can secure the second leg to the front side of the flat bar spaced apart from the first leg a distance equal to the length of the body of the rod. The equipment holder can maintain hip waders or boots while exposed to the elements securely in an inverted position between the flat bar and the body, preventing the hip waders or boots from coming loose.

In embodiments, the flat bar can have information presented in a messaging area. In one or more embodiments, the messaging area can have a surface of about 4 inches to 18 inches in length, of about 1 inch to 1.5 inches in width on the front side of the flat bar, beneath the body with a thickness from about $1/8^{th}$ of an inch to 1 inch.

In embodiments, the rod can range in length from about 20 inches to about 26 inches, to accommodate a pair of adult sized boots.

In embodiments, the body of the rod can range in length from about 17 inches to about 21 inches.

In embodiments, the leg length can be from about 2 inches to about 4 inches. In one or more embodiments, both legs have the same length.

In other embodiments, one leg can have a length 20 percent to 50 percent less than the other leg, creating a triangular area between the flat bar and the body which remarkably and easily allows insertion of the equipment into the space between the body and the flat bar, and then allows for wedging of the equipment from a more open portion to a more narrow portion to maintain the equipment in the inverted position securely while the vehicle bounces over debris. This embodiment enables the equipment holder to have sufficient space to shove the boots into the securing area for quick insertion and removal while preventing the boots from flying out of the equipment holder.

In embodiments, the rod can have an outer diameter of about ¼ inch and can be solid aluminum in a cylindrical shape. In other embodiments, the rod can have a diameter of ½ inch, ¾ inch, or even 1 inch.

In embodiments, the rod outer surface can be smooth. In embodiments, the rod shape can be round or square. In embodiments the rod can have at least one portion of the body that is textured.

In embodiments, the coating of the equipment holder can be an anodized coating, a urethane coating, a powder coating, a vulcanized rubber coating, a plasticized coating, or combinations thereof.

In embodiments, the equipment holder can hold boots for farm workers and can be attached to the bed of a pick-up truck.

Turning now to the Figures, FIG. 1A shows an equipment holder 10 for the removable attachment to a mounting area wherein the equipment holder can hold at least one pair of boots. The equipment holder can hold the boots in an inverted position.

The equipment holder 10 can include a flat bar 12 having a front side. The flat bar can have a length from 12 inches to 240 inches, a width from 1 inch to 10 inches and a thickness from $1/8^{th}$ of an inch to 1 inch.

A rod 18 can be 12 inches long with a diameter of 0.5 inches and can be solid. The rod can have a body 20 with a body length that includes the length of two legs. In this embodiment, a first leg 22 can be formed at a right angle and connected to the body, and a second leg 24 can be formed at a right angle and connected to the body on an end opposite the first leg.

Each leg can be connected to the flat bar, such as by a fastener, weld, or other connecting means.

The legs can be coupled to the body. The legs and body can be a single rod that is bent to form the first leg and the second leg. The body length can be the length of the entire rod including the length of the body and the lengths of the legs.

The second leg 24 can be the same length as the first leg 22. The legs can support the body 20 away from the flat bar.

In an embodiment, the rod can have a first hollow portion and a second hollow portion. In other embodiments, the rod can be solid.

A first attaching device can attach a first leg through a first placement hole 34 in the flat bar 12.

A second attaching device can attach the second leg through a second placement hole 35 in the flat bar 12.

The attaching device can be welds in an embodiment, forming a flush weld of the end of each leg with the back of the flat bar.

In an embodiment, the equipment holder 10 can have a first mounting hole 37 and a second mounting hole 39 formed through the flat bar 12 to attach the flat bar to a pickup truck bed, a tool box top or other device. Screws or rivets can be used to secure the flat bar to another surface through these mounting holes.

FIG. 1B shows a cross section of the rod 18 with a fluorescent coating 19 encapsulating the rod to aid in location of the equipment.

FIG. 1C shows a cross section of the rod 18 with an impact resistant coating 38.

FIG. 2 shows an embodiment of the equipment holder 10 having the flat bar 12, the first and second mounting holes 37 and 39, the rod 18, and a holster 30. In one or more embodiments, the holster can be a circular shape.

FIG. 3A shows an embodiment of the equipment holder 10 with the holster 30 mounted to the flat bar 12 adjacent to one of the legs. The holster can be mounted using a weld or other fastening means. The holster can be attached to the adjacent leg in addition to the flat bar.

The equipment holder 10 can include a multiuse hook 32 secured to the flat bar 12, such as by a weld or other fastening means, and the multiuse hook 32 can be adapted for holding a safety harness, knife, machete, and other equipment or tools.

In embodiments, the equipment holder can include a messaging area 48 for presenting emergency information with a surface on the front side of the flat bar 12 behind the body of the rod 18.

A shock resistant coating 36 can be applied to the entirety of the flat bar 12.

Figure 3B:
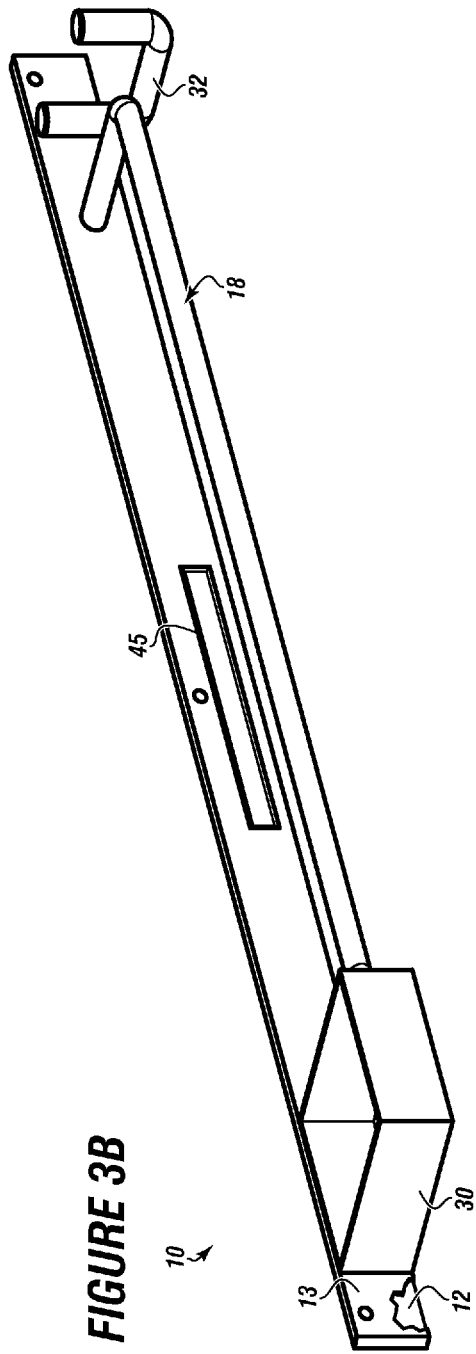
FIG. 3B depicts another embodiment of the equipment holder with a reflective coating.

FIG. 3B shows an embodiment of the equipment holder 10 with a holster 30 mounted to the flat bar 12. The holster 30 can be a square shape, as shown in this embodiment. The holster 30 can be connected to the flat bar and/or one of the legs using a weld or other fastening means.

The flat bar 12 is shown covered in a reflective coating 13. In an embodiment, the flat bar can be encapsulated with the reflective coating which can be fluorescent.

In an embodiment, the holster 30 can be fastened to the first leg and the flat bar simultaneously. The holster can have a diameter from 1 inch to 6 inches. The holster can have a width of from 1 inch to 10 inches and be made of aluminum.

The holster can be adapted for holding nozzles for firefighting equipment, fire extinguishers, and grease guns. The holsters can enable nozzles attached to rescue or firefighting to be positioned and held without dripping or leaking and sufficiently restrained without the need for leashes or other brackets, and successfully prevent the nozzles from dripping onto the surface below the equipment holder.

The equipment holder 10 can include a light 45, such as an LED light. The light can be permanently affixed to the flat bar 12 behind the body of the rod 18.

The equipment holder 10 can include the multiuse hook 32 secured to the flat bar 12, such as by a weld or other fastening means.

Figure 4:
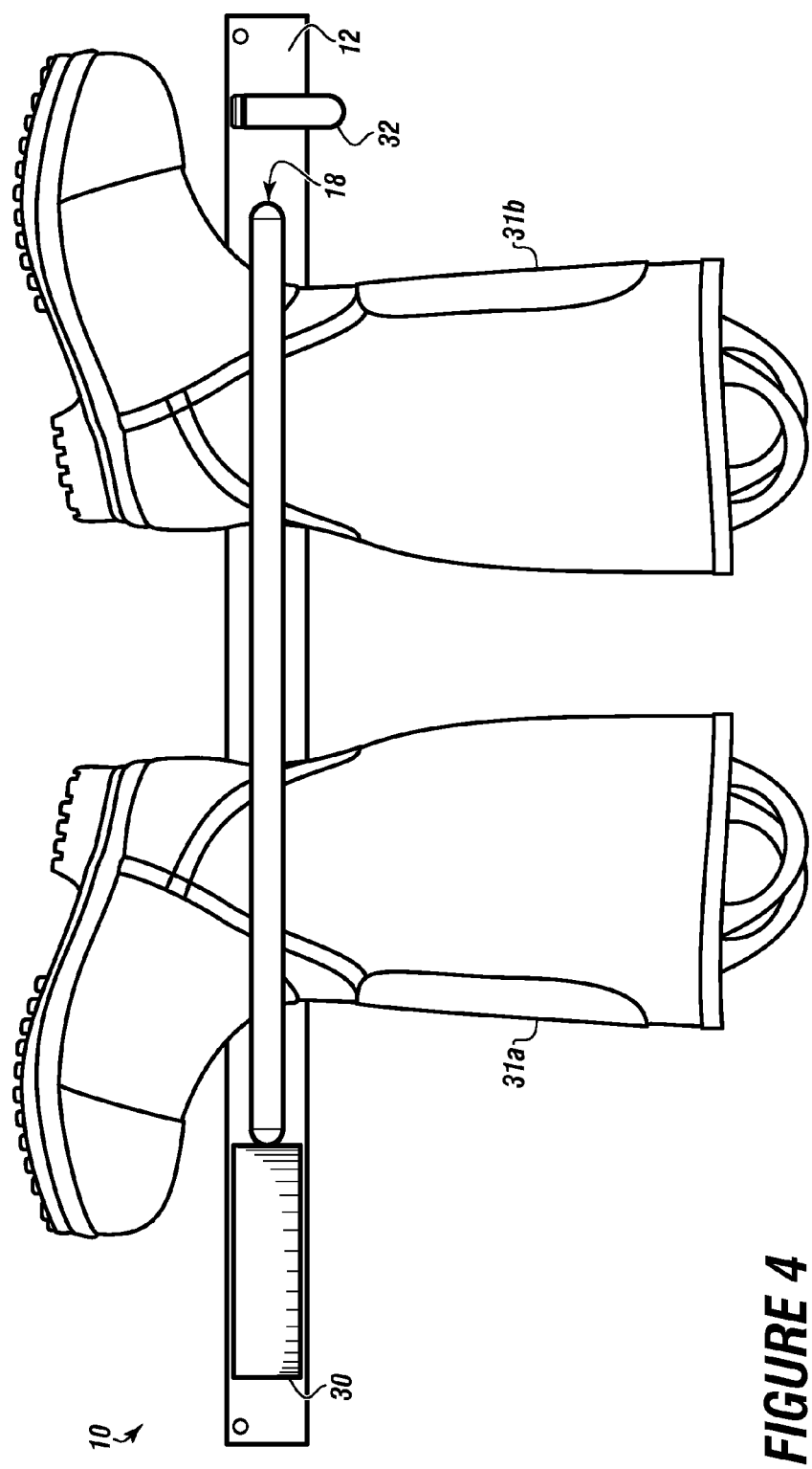
FIG. 4 depicts an embodiment of the equipment holder with a pair of boots secured thereto.

FIG. 4 shows the equipment holder 10 holding boots 31a and 31b wedged into the space between the body of the rod 18 and the flat bar 12.

The multiuse hook 32 and the holster 30 are also depicted attached to the flat bar 12.

FIG. 5 is a top view of the equipment holder, which shows a wedge shaped opening between the rod 18 and the flat bar 12, allowing wedging of the equipment into a more restrained space wherein the rod 18 is closer to the flat bar 12 at one end of the body 20 than at the other end, as the first leg 22 has a different length than the second leg 24, such as 50 percent longer than the second leg.

This wedge shape is particularly usable in high winds with flying debris that can knock the equipment out of the vehicle. An advantage of the invention is that no bungee cords, locks, or mechanized pieces are needed, which can get jammed preventing the immediate and quick removal of the equipment once the user needs it.

A clamp 61 can fasten the holster 30 to the first leg 22 of the rod 18.

The flat bar 12 is shown having a front side 14, back side 16, and the first and second placement holes 34 and 35.

In embodiments, the flat bar can be mounted to a wall of a facility or on a toolbox.

In embodiments, the flat bar can be mounted to a transport vehicle, such as a pickup truck, a boat, an emergency vehicle, such as a fire truck, an all-terrain vehicle, a sport utility vehicle, a helicopter, or other similar vehicle.

The rod can be a 100 percent aluminum rod, a steel rod, a carbon fiber rod, a brass rod, a fiberglass rod, a wood rod, a polyvinyl chloride rod, a stainless steel rod, a rod formed from alloys of these metals, or a rod that is part of one of these materials and part of another one of these materials in combination thereof.

In an embodiment, the rod can be at least partially hollow.

Embodiments of the equipment holder can include using a shock resistant coating to enhance resistance and holding of the footwear against the flat bar and prevent transfer of electrostatic charge.

In an embodiment, the impact resistance coating can cover the entire rod or the entire equipment holder, encapsulating the rod or the entire equipment holder for enhanced durability.

The messaging area formed on the flat bar can be used for indicating emergency information for use by first responders.

In embodiments, a reflective coating can be disposed on the front of the flat bar to provide ease of location of the equipment holder during a hurricane or similar event.

While these embodiments have been described with emphasis on the embodiments, it should be understood that within the scope of the appended claims, the embodiments might be practiced other than as specifically described herein.

What is claimed is:

1. An equipment holder for firefighters for secure and non-removable attachment to a transport vehicle, the equipment holder comprising:
    a. a flat bar having a front side and a back side;
    b. a one piece rod with a reflective fluorescent coating, wherein the one piece rod has a rod body with a body length, a first leg directly connected to the rod body at a first angle and a second leg directly connected to the rod body at a second angle, both the first leg and the second leg directly connected to the flat bar at a right angle, and a space is formed between the flat bar and the one piece rod, wherein the space is configured to receive and hold a pair of boots in an inverted position; and
    c. a holster for securing equipment directly connected with the flat bar and one of the legs.

2. The equipment holder of claim 1, further comprising a multiuse hook connected with the flat bar, and wherein the one piece rod is located between the multiuse hook and the holster.

3. The equipment holder of claim 1, further comprising a first placement hole formed through the flat bar to receive the first leg in the flat bar and a second placement hole formed through the flat bar to receive the second leg in the flat bar, and wherein a first fastener and a second fastener secure the flat bar around the first leg and the second leg without sticking through the back side.

4. The equipment holder of claim 1, wherein the flat bar is mounted to a wall of a facility or on a toolbox.

5. The equipment holder of claim 1, wherein the flat bar is mounted to an interior portion of a transport vehicle.

6. The equipment holder of claim 5, wherein the transport vehicle is a pickup truck or a boat.

7. The equipment holder of claim 1, wherein the one piece rod comprises aluminum, steel, carbon fiber, brass, copper, fiber glass, polyvinyl chloride, stainless steel, alloys of these metals, combinations thereof or wood.

8. The equipment holder of claim 1, wherein the one piece rod has a hollow portion.

9. The equipment holder of claim 1, further comprising a shock resistant coating on the rod to enhance resistance and holding of the footwear against the flat bar and to prevent transfer of electrostatic charge.

10. The equipment holder of claim 1, further comprising an impact resistant coating on the entire equipment holder, encapsulating the equipment holder for enhanced durability.

11. The equipment holder of claim 1, further comprising a light affixed to the flat bar.

12. The equipment holder of claim 1, further comprising a messaging area formed on the flat bar for indicating emergency information.

13. The equipment holder of claim 1, wherein the first leg, the second leg and the rod body form a wedge shape.

14. An equipment holder for rescue teams comprising:
    a. a flat bar with a reflective coating having a front side and a back side;
    b. a one piece rod with an impact resistant coating, wherein the one piece rod has a rod body with a body length, a first leg directly connected to the rod body at a first angle and a second leg directly connected to the rod body at a second angle, both the first leg and the second leg directly connected to the flat bar and a wedge shaped space formed between the flat bar and the one piece rod, wherein the wedge shaped space is configured to receive and hold a pair of boots in an inverted position; and
    c. a holster for securing equipment directly connected with the flat bar and one of the legs.

15. The equipment holder for rescue teams of claim 14, wherein the holster has a circular cross sectional shape or a square cross sectional shape.

* * * * *